United States Patent Office 3,053,864
Patented Sept. 11, 1962

3,053,864
15α-METHYL-15β-HYDROXY ANALOGUES OF 9α FLUORO CORTISONE AND HYDROCORTISONE AND THEIR Δ' DERIVATIVES
Philip F. Beal and Fred Kagan, Kalamazoo, Mich., assignors to The Upjohn Company, Kalamazoo, Mich., a corporation of Delaware
No Drawing. Filed Feb. 24, 1960, Ser. No. 10,568
8 Claims. (Cl. 260—397.45)

This invention relates to steroidal compounds and is more particularly concerned with 15α-methyl-15β-hydroxy-hydrocortisone, -cortisone, -prednisone, -prednisolone, the esters thereof, 9-fluoro analogues thereof, 15α- and 15β-hydroxyprednisone, -prednisolone, the 9-fluoro analogues thereof, esters thereof, and a process for the preparation thereof.

The compounds and a process of production thereof are illustratively represented in the following sequence of formulae:

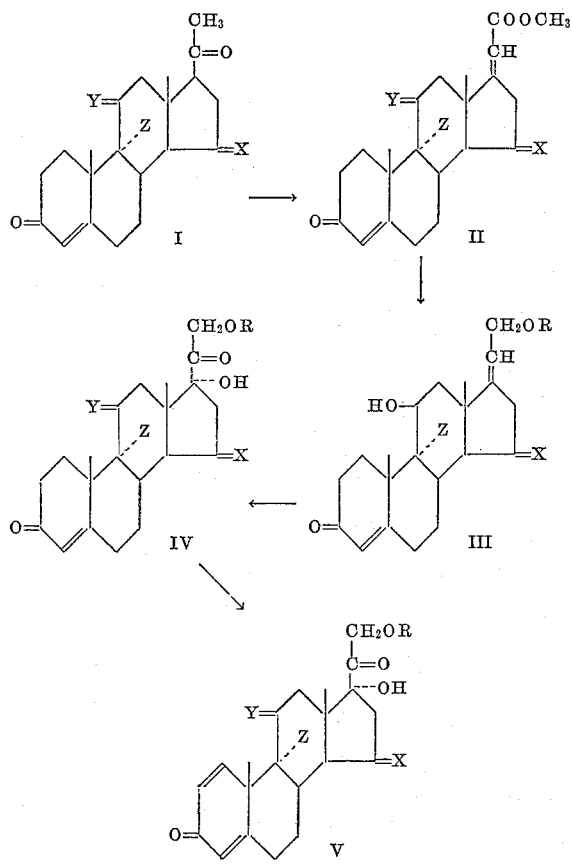

wherein R is selected from hydrogen and acyl radicals, the acyl radical being of an organic carboxylic acid and preferably of a hydrocarbon carboxylic acid containing from one to twelve carbon atoms, inclusive, wherein X is selected from the group consisting of

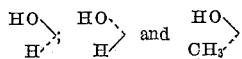

wherein Y is selected from the group consisting of (β- hydroxy, α-hydrogen) and ketonic oxygen, and wherein Z is selected from the group consisting of hydrogen and fluoro.

The novel compounds of this invention which particularly possess valuable pharmacological activities, such as glucocorticoid and anti-inflammatory activities have the formula:

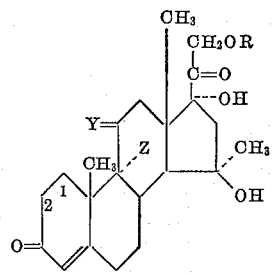

wherein the 1,2-carbon linkage is selected from the linkages consisting of saturated linkages and unsaturated double bond linkages, wherein Z is selected from the substituents consisting of hydrogen and fluorine, Y is selected from the groups consisting of

and keto and R is selected from the group consisting of hydrogen and acyl, the acyl group being of a hydrocarbon carboxylic acid containing up to and including twelve carbon atoms. Similarly active as anti-inflammatory and glucocorticoid agents are 9α-fluoro-15α- and 15β-hydroxyhydrocortisone, -cortisone, -prednisone and -prednisolone and the 15α- and 15β-hydroxyprednisone and prednisolone as well as the 21-acylate esters thereof, wherein the acyl group is defined as above. Moreover, the obvious alkyl derivatives of the before-mentioned compounds, particularly those of Formula VI, having one or more methyl groups in position 2, 6 or 16, either as α or β epimers, are also useful as glucocorticoid and anti-inflammatory agents.

These compounds are useful in the treatment of inflammatory conditions of mammals and birds and are particularly useful in the treatment of conditions of the skin, eyes, and ears of humans and of domestic animals.

Administration of the novel steroids of Formula I can be in conventional dosages forms, such as pills, tablets, capsules, syrups, or elixirs for oral use, or in liquid forms which are adaptable to the natural and synthetic cortical steroid hormones for injectable products. The novel compounds of Formula VI can also be administered topically in the form of ointments, creams, lotions, and the like, with or without coacting antibiotics, sulfonamides, germicides or other materials forming advantageous combination therewith.

Broadly described the process comprises: treating an 11-oxygenated-15-hydroxyprogesterone of Formula I (a) with an alkyl oxalate in basic solution, (b) brominating the obtained product of this reaction; (c) treating the brominated product with alkali metal alkoxide; and (d) with zinc in acetic acid to produce the corresponding 11-oxygenated methyl-3-keto - 15β - hydroxy-4,17(20)-pregnadien-21-oate (II); converting the thus obtained ester (II) to its 3-enamine by heating with a secondary cyclic amine, e.g. pyrrolidine, morpholine, piperidine or other cyclic amines; treating the thus obtained enamine with a metal hydride, e.g. lithium aluminum hydride, lithium borohydride or other alkali metal borohydrides and alkali metal aluminum hydrides and hydrolyzing to give the corresponding 11β,15,21-trihydroxy-4,17(20)-pregnadien-3-one (III); treating compound III with an organic acid halide or anhydride e.g. acetic, propionic, butyric, or benzoic anhydride or phenylacetyl, β-cyclopentylpropionyl or other acyl chloride to give the corresponding 21-ester of 11β,15,21 - trihydroxy - 4,17(20)-pregnadien-3-one; treating this ester with osmium tetroxide in the presence of an organic peroxide to give the corresponding 15-hydroxy hydrocortisone 21-ester (IV) which by conventional saponification yields the corresponding 15-hydroxyhydrocortisone. If desired 15-hydroxyhydrocortisone or its 21-acylates can be dehydrogenated with microorganisms such as Septomyxa, Corynebacterium, Fusarium, Calonectria, and the like to give the corresponding 15-hydroxyprednisolone (V). Dehydrogenation of the 21-acylate of a 15-hydroxyhydrocortisone with selenium dioxide yields the corresponding 21-acylate of 15-hydroxyprednisolone. Oxidation of such 15-hydroxyhydrocortisone acylate or 15-hydroxyprednisolone acylate with a chromic acid oxidant provides the corresponding 11-keto analogs, 15-hydroxycortisone 21-acylates and 15-hydroxyprednisone 21-acylates, from which the free bases are obtained by conventional saponification.

The starting materials of this reaction are 11-oxygenated 15-hydroxyprogesterones which are obtained as shown in the preparations.

PREPARATION 1

*15α-Hydroxy-11-Ketoprogesterone*

A medium was prepared of ten grams of Cerelose (dextrose) 20 grams of corn steep liquor and 1000 milliliters of water and adjusted to a pH between 5.5 and 6. Twelve liters of this sterilized medium was inoculated with spores of *Penicillium urticae* ATCC 10120 and incubated for a period of 24 hours at a temperature of 26 degrees centigrade, using a rate of aeration and stirring such that the oxygen up-take was 13 millimoles per hour per liter of $Na_2SO_3$, according to the method of Cooper, Fernstrom and Miller, Ind. Eng. Chem. 36, 504 (1944). To this medium containing a 24 hour growth of *Penicillium urticae* was added 2 grams of 11-ketoprogesterone, dissolved in 100 milliliters of acetone. After an additional 24 hour period of incubation under the same conditions of temperature and aeration, the beer and mycelium were separated. The mycelium was filtered, washed twice, each time with a volume of acetone approximately equal to the volume of the mycelium, and extracted twice, each time with a volume of methylene chloride approximately equal to the volume of the mycelium. The acetone and methylene chloride extracts, including solvent, were added to the beer filtrate and the combined extracts and beer filtrates were extracted successively with two one-half by volume portions of methylene chloride and then with two one-fourth by volume portions of methylene chloride. The methylene chloride extracts were washed with two one-tenth by volume portions of a 2% aqueous solution of sodium bicarbonate and then with two one-tenth by volume portions of water. After drying the methylene chloride extracts with about 3 to 5 grams of anhydrous sodium sulfate per liter of solvent and filtering, the solvent was distilled from the filtrate. The residue thus obtained was recrystallized two times from acetone and ether in 1 to 1 ratio and one time from acetone and Skellysolve B to give 15α-hydroxy-11-ketoprogesterone of melting point 227–229° and rotation +257° (in EtOH).

PREPARATION 1A

*15α-Hydroxy-9(11)-Dehydroprogesterone*

Substituting in Preparation 1 for 11-ketoprogesterone 9(11)-dehydroprogesterone results in the preparation of 15α-hydroxy-9(11)-dehydroprogesterone.

PREPARATION 2

*15α-Hydroxy-4-Pregnene-3,11,20-Trione 3,20-Bis-(Ethylene Ketal)*

A mixture of 4.75 grams of 15α-hydroxy-11-ketoprogesterone, 100 milliliters of benzene, 5 milliliters of ethylene glycol and 0.1 gram of para-toluenesulfonic acid was refluxed with stirring under a water trap for six hours. The mixture was then cooled and the product crystallized. The acid was neutralized by the addition of 10 milliliters of saturated sodium bicarbonate solution and the mixture stirred for fifteen minutes. The crystalline precipitate was removed by filtration and oven-dried. The product was recrystallized from acetone containing a drop of pyridine, to yield 2 grams of crystals melting at 248–250°. A second crop furnished 0.80 gram. The original filtrate was evaporated, the residue and also the second crop were recrystallized to yield an additional 1.12 grams of 15α-hydroxy-4-pregnene-3,11,20-trione 3,20 - bis(ethylene ketal), melting at 246–248 degrees centigrade.

*Anal.*—Calcd. for $C_{25}H_{36}O_6$: C, 69.42; H, 8.59. Found: C, 69.41; H, 8.42.

$[α]_D$ +62° (acetone);

$\gamma_{max.}^{Nujol}$ 3530, 1697, 1100 cm.$^{-1}$

PREPARATION 2A

*15α-Hydroxy-9(11)-Dehydroprogesterone 3,20-Bis-(Ethylene Ketal)*

Substituting 15α - hydroxy-9(11)-dehydroprogesterone for 15α-hydroxy-11-ketoprogesterone in Preparation 2 gives 15α-methyl-9(11)-dehydroprogesterone 3,20 - bis-(ethylene ketal).

PREPARATION 3

*4-Pregnene-3,11,15,20-Tetraone 3,20-Bis-(Ethylene Ketal)*

A solution of 5.0 grams of 15α-hydroxy-11-ketoprogesterone 3,20-bis(ethylene ketal) in 50 milliliters of pyridine was added to a solution of 5.0 grams of chromium trioxide in 50 milliliters of pyridine. The reaction mixture was allowed to stand overnight. The mixture was diluted with 300 milliliters of water and extracted with methylene chloride. The solvent was removed in vacuo and the product recrystallized from a mixture of acetone and Skellysolve B hexanes to give 2.6 grams of 4-pregnene-3,11,15,20-tetraone-3,20-bis(ethylene ketal) of melting point 198–206°. A sample was twice more recrystallized to give 4-pregnene - 3,11,15,20 - tetraone 3,20-bis(ethylene ketal) with melting point 208–210° and rotation $[α]_D$ —16 degrees (acetone).

PREPARATION 3A

*15-Keto-9(11)-Dehydroprogesterone 3,20-Bis(Ethylene Ketal)*

Substituting 15α - hydroxy-9(11)-dehydroprogesterone 3,20-bis(ethylene ketal) in Preparation 3 for 15α-hydroxy-11-ketoprogesterone results in 15-keto-9(11)-dehydroprogesterone 3,20-bis(ethylene ketal).

PREPARATION 4

*15β-Hydroxy-11-Ketoprogesterone 3,20-Bis(Ethylene Ketal)*

A solution of 11,15-diketoprogesterone, 3,20-bis(ethylene ketal) (12.4 g.) in 200 milliliters of purified tetrahydrofuran was added to one liter of isopropyl alcohol. Thereupon 2.1 grams of sodium borohydride and 20 milliliters of water was added and the mixture stirred at room temperature for 3½ hours. The excess borohydride was destroyed by the addition of a few drops of acetic acid. The mixture was thereupon neutralized by the addition of saturated sodium bicarbonate. The reaction mixture was allowed to evaporate under the hood. The residual material was partitioned between methylene chloride and water, and the organic layer was separated, filtered, and evaporated under reduced pressure to give a residue. This residue was dissolved in hot methanol, filtered, and allowed to crystallize to give 8.6 grams of 15β-hydroxy-11-ketoprogesterone 3,20-bis(ethylene ketal) A sample which was crystallized twice more from methanol melted at 205 to 208 degrees centigrade.

*Anal.*—Calcd. for $C_{25}H_{36}O_6$: C, 69.42; H, 8.39. Found: C, 68.20; H, 8.56.

PREPARATION 4A

15β-Hydroxy-9(11)-Dehydroprogesterone 3,20-Bis-(Ethylene Ketal)

In the same manner given in Preparation 4 15β-hydroxy-9(11)-dehydroprogesterone 3,20-bis(ethylene ketal) is prepared by reducing 15-keto-9(11)-dehydroprogesterone 3,20-bis(ethylene ketal) with sodium borohydride.

PREPARATION 5

11-Keto-15β-Hydroxyprogesterone

A solution of 11-keto-15β-hydroxyprogesterone 3,20-bis(ethylene ketal) (8.66 grams) in 200 milliliters of acetone was diluted with 25 milliliters of water containing 25 drops of concentrated sulfuric acid. After standing overnight at room temperature, (about 22 to 25 degrees centigrade) the acid was neutralized with saturated sodium bicarbonate and the solvent removed in vacuo. The residue was partitioned with methylene chloride and water. The product did not go into solution and therefore the mixture was filtered to remove the solid. The filtrate was separated and the methylene chloride layer was allowed to evaporate. The solids were recrystallized from methanol to yield a product (4.1 grams) of melting point 203–205 degrees centigrade. 3.3 grams of this material was recrystallized again from methanol yielding crystals of melting point 199 to 203 degrees and a rotation $[\alpha]_D$ of +187 degrees in acetone.

*Analysis.*—Calcd. for $C_{21}H_{28}O_4 \cdot H_2O$: C, 69.58; H, 8.34; $H_2O$, 4.97. Found: C, 69.84; H, 8.09; $H_2O$, 5.15.

PREPARATION 5A

15β-Hydroxy-9(11)-Dehydroprogesterone

Hydrolyzing 15β-hydroxy-9(11)-dehydroprogesterone 3,20-bis(ethylene ketal) in the manner given in Preparation 5 results in 15β-hydroxy-9(11)-dehydroprogesterone.

PREPARATION 6

15α-Methyl-15β-Hydroxy-4-Pregnene-3,11,20-Trione 3,20-Bis(Ethylene Ketal)

A solution was prepared containing 1.15 grams of 4-pregnene-3,11,15,20-tetraone 3,20-bis(ethylene ketal) in 50 milliliters of tetrahydrofuran. This solution was cooled in an ice bath and thereto was added 20 milliliters of a commercial three-molar methyl magnesium bromide solution in ether. The ice bath was removed and the reaction stirred at room temperature for five hours. The reaction mixture was then decomposed by the addition of a saturated ammonium chloride solution. The liquid was decanted from the solids and filtered. The solids were washed with methylene chloride. The methylene chloride washings were added to the filtrate and the filtrate was allowed to evaporate yielding 1.07 grams of material which was recrystallized from acetone Skellysolve B hexanes to give 15α-methyl-15β-hydroxy-4-pregnene-3,11,20-trione 3,20-bis(ethylene ketal) of melting point 206–210 degree centigrade.

*Analysis.*—Calcd. for $C_{26}H_{38}O_6$: C, 69.93; H, 8.58. Found: C, 67.97; H, 8.86 $[\alpha]_D$ (acetone) +15°;

$\lambda_{max.}^{Nujol}$ 3540, 3400, 1695, 1670, 1163, 1095, 1025

PREPARATION 6A

15α-Methyl-15β-Hydroxy-4,9(11)-Pregnadiene-3,20-Dione 3,20-Bis(Ethylene Ketal)

Substituting 15-keto-9(11)-dehydroprogesterone 3,20-bis(ethylene ketal) for 4-pregnene-3,11,15,20-tetraone 3,20-bis(ethylene ketal) in the process of Preparation 6 results in 15α-methyl-15β-hydroxy-4,9(11)-pregnadiene-3,20-dione 3,20-bis(ethylene ketal).

PREPARATION 7

15α-Methyl-15β-Hydroxy-11-Ketoprogesterone

A warm solution of 15α-methyl-15β-hydroxy-11-ketoprogesterone 3,20-bis(ethylene ketal) containing 10.4 grams of material in 200 milliliters of acetone was treated with 20 milliliters of water, containing 25 drops of concentrated sulfuric acid, and allowed to stand at room temperature for several minutes. After a few minutes a solid crystallized out. The mixture was again warmed on a steam bath, but solution did not occur. The solid was removed by filtration and the filtrate allowed to stand overnight. The filtrate was neutralized with saturated sodium bicarbonate solution and the solvent removed in vacuo. During solvent removal, the product crystallized. Distillation was stopped and the product removed by filtration. After oven-drying the product (6.5 grams) melted at 235–248°. This material was twice recrystallized from acetone to give 15α-methyl-15β-hydroxy-11-ketoprogesterone of melting point 247 to 250 degrees centigrade.

*Analysis.*—Calcd. for $C_{23}H_{30}O_4$: C, 73.71; H, 8.48. Found: C, 73.90; H, 8.48.

$\nu_{Nujol}^{max.}$ OH, 3420

C=O, 1705, 1685; conj. C=O, 1660; C=C, 1615

PREPARATION 7A

15α-Methyl-15β-Hydroxy-4,9(11)-Pregnadiene-3,20-Dione

In the same manner given in Preparation 7, hydrolyzing 15α-methyl-15β-hydroxy-4,9(11)-pregnadiene-3,20-dione 3,20-bis(ethylene ketal) results in 15α-methyl-15β-hydroxy-4,9(11)-pregnadiene-3,20-dione.

PREPARATION 8

15α-Hydroxy-9,11-Dehydroprogesterone 15-Acetate

A solution was prepared containing one gram of 15α hydroxy-9,11-dehydroprogesterone in five milliliters of pyridine and five milliliters of acetic anhydride. This mixture was allowed to stand overnight for eighteen hours at room temperature (approximately 24 to 26 degrees centigrade) and was thereupon poured in fifty milliliters of ice and water mixture. The solid and oily material were separated from the water, washed with dilute hydrochloric acid, and with water, dried in a vacuum at room temperature. The solid residue was recrystallized two times from aqueous methanol to give pure 15α-hydroxy-9,11-dehydroprogesterone 15-acetate.

In the same manner 15α-hydroxy-9,11-dehydroprogesterone was esterified with acetic anhydride to give 15β-hydroxy-9,11-dehydroprogesterone 15-acetate.

PREPARATION 9

9-Fluoro-11β,15β-Dihydroxy-15α-Methylprogesterone

One gram of 9(11)-dehydro-15α-methyl-15β-hydroxyprogesterone, suspended in 20 milliliters of acetone, was cooled in a water bath at fifteen degrees centigrade and thereupon treated with 0.50 gram of N-bromoacetamide in 10 milliliters of water. Thereto was added dropwise and with stirring 18 milliliters of 0.8 Normal perchloric acid. A precipitate of needles separated and after fifteen minutes the excess reagent was destroyed by adding sodium sulfite solution. After cooling to zero degrees centigrade for a period of 40 minutes the product 9α-bromo-11β,15β-dihydroxy-15α-methylprogesterone was recovered by filtration and purified by recrystallization from methanol and Skellysolve B hexanes.

A suspension was prepared containing 2.4 grams of 9α-bromo-11β,15β-dihydroxy - 15α - methylprogesterone, suspended in fifty milliliters of methanol. To the stirred solution was dropwise added 0.2 Normal aqueous sodium hydroxide solution until pink to phenolphthalein. The mixture was then concentrated in vacuo and extracted with two 25 milliliter portions of ether. The ether solutions were combined, washed with water, dried over anhydrous sodium sulfate and evaporated to give 1.9 grams of 9β,11β-oxido-15α-methyl-15β-hydroxyprogesterone.

The 1.9 grams of 9β,11β-oxido-15α-methyl-15β-hydroxyprogesterone was dissolved in 16-milliliters of methylene chloride and the thus obtained solution was cooled in a Dry Ice-acetone bath to about minus sixty to minus seventy degrees centigrade. To this mixture was added 3.5 grams of anhydrous hydrogen fluoride in 4 milliliters of methylene chloride and 6.5 grams of tetrahydrofuran also precooled to −60 degrees centigrade. This mixture was allowed to stand at −18 degrees for a period of three hours and was then poured with stirring into a mixture of 30 grams of sodium carbonate in 120 milliliters of water containing 90 grams of ice. After five minutes of stirring the liquid was placed in the refrigerator for one hour and the insoluble product was recovered by filtration, washed with water and ether and dried over anhydrous sodium sulfate. The yield of about 1.1 grams of 9α-fluoro-11β,15β-dihydroxy-15α-methylprogesterone was thus obtained which was purified by recrystallization from dilute methanol.

PREPARATION 10

*9α-Fluoro-11β,15β-Dihydroxyprogesterone and the 15-Acetate Thereof*

Substituting in Preparation 9 15α-hydroxy-9(11)-dehydroprogesterone 15-acetate for 9(11)-dehydro-15α-methyl-15β-hydroxyprogesterone results in the production of 9α-fluoro-11β,15α-dihydroxyprogesterone 15-acetate.

Hydrolyzing 9α-fluoro-11β,15α-dihydroxyprogesterone 15-acetate in methanol in the presence of a small amount of sodium hydroxide in a nitrogen atmosphere produces the free alcohol, 9α-fluoro-11β,15α-dihydroxyprogesterone.

PREPARATION 11

*9α-Fluoro-11β,15β-Dihydroxyprogesterone and the 15-Acetate Thereof*

Substituting in Example 9 9(11)-dehydro-15β-hydroxyprogesterone 15-acetate for 9(11)-dehydro-15α-methyl-15β-hydroxyprogesterone results in the production of 9α-fluoro-11β,15β-dihydroxyprogesterone 15-acetate.

Conventional hydrolysis of 9α-fluoro-11β,15β-dihydroxyprogesterone 15-acetate with dilute alkali results in yields of 9α-fluoro-11β,15β-dihydroxyprogesterone.

PREPARATION 12

*9α-Fluoro-11-Keto-15α-Methyl-15β-Hydroxyprogesterone*

To a solution of 1 gram of 9α-fluoro-11β,15β-dihydroxy-15α-methylprogesterone in ten milliliters of pyridine was added a solution of one gram of chromic anhydride in ten milliliters of pyridine. The reaction mixture was allowed to stand for 18 hours at room temperature. The mixture was then diluted with 50 milliliters of water and extracted with two 25-milliliter portions of methylene chloride. The methylene chloride portions were combined, dried over anhydrous sodium sulfate and evaporated to give a residue of 9α-fluoro-11-keto-15α-methyl-15β-hydroxyprogesterone which was purified by recrystallization from dilute methanol.

In the same manner as shown in Preparation 12, 9α-fluoro-11-keto 15α-hydroxyprogesterone 15α-acetate and 9α-fluoro-11-keto-15β-hydroxyprogesterone 15β-acetate are produced from the corresponding 9α-fluoro-11β,15(α or β) dihydroxyprogesterone 15-acetates.

Saponification of these esters with dilute sodium hydroxide in methanol preferably in a nitrogen atmosphere produces the corresponding 9α-fluoro-11-keto-15α- and 15β-hydroxyprogesterone.

EXAMPLE 1

*Methyl 3,11-Diketo-15α-Methyl-15β-Hydroxy-4,17(20)-Pregnadien-21-Oate*

A mixture of 1.46 grams of 15α-methyl-15β-hydroxy-11-ketoprogesterone, 14 milliliters of tertiary butyl alcohol and 2.2 milliliters of ethyl oxalate was heated to 60 degrees centigrade in a nitrogen atmosphere. Since solution did not occur readily 10 milliliters of methylene chloride was added. When the solution was complete, the reaction mixture was allowed to cool to 40 degrees centigrade and 2.2 g. of a methanolic solution of sodium methoxide (25% sodium methoxide by weight) was added. A solid glyoxalate separated immediately. After five minutes the nitrogen was stopped and the flask evacuated to remove the methylene chloride. The mixture was then stirred for an additional thirty minutes and a solution of 0.49 gram of sodium acetate and 0.58 milliliter of acetic acid in 32 milliliters of methanol, previously cooled to ten degrees centigrade, was added. The reaction mixture was then cooled to plus 3 degrees and allowed to stir until the solid dissolved. To this solution was added 1.9 grams of bromine, dissolved in 19 milliliters of methanol. The rate of addition was kept so that the temperature did not rise above 5 degrees centigrade. After the addition was complete, the reaction mixture was stirred for an additional ten minutes. Thereupon 4.3 grams of 25% sodium methoxide in methanol was added. The reaction mixture first turned orange and then faded to a light green. After twenty minutes an additional portion of the sodium methoxide solution (0.4 milliter) was added. After a total of fifty minutes of stirring, 3.7 milliliters of acetic acid and 0.7 gram of zinc powder was added. The mixture was allowed to stir overnight. The reaction mixture was then filtered through diatomaceous earth (Celite) and the solvent removed in vacuo. The residue was partitioned between methylene chloride and water. The organic extract was chromatographed over 100 grams of Florisil taking fractions of 100 milliliters as follows:

TABLE I

| Fraction | Solvent | Residue in Milligrams |
|---|---|---|
| 1 | MeCl₂ | 13 |
| 2 | 10% Acetone-Skellysolve B | 0 |
| 3 | do | 5 |
| 4 | do | 2 |
| 5 | do | 3 |
| 6 | do | 24 |
| 7 | do | 81 |
| 8 | do | 118 |
| 9 | do | 180 |
| 10 | 15% Acetone-Skellysolve B | 235 |
| 11 | do | 177 |
| 12 | do | 132 |
| 13 | do | 95 |
| 14 | do | 45 |
| 15 | do | 28 |
| 16 | 20% Acetone-Skellysolve B | 5 |
| 17 | do | 8 |
| 18 | do | 11 |
| 19 | do | 11 |
| 20 | do | 7 |
| 21 | do | 4 |
| 22 | do | 6 |
| 23 | Acetone | 56 |
| 24 | do | 93 |

The fractions containing 15% acetone in Skellysolve B hexanes were combined and evaporated to give a crystalline product (0.864 gram) which was recrystallized from acetone to yield 0.64 gram of methyl 3,11-diketo-15α-methyl-15β-hydroxy - 4,17(20)-pregnadien-21-oate of melting point 231–233 degrees centigrade.

Analysis.—Calcd. for $C_{25}H_{30}O_5$: C, 71.48; H, 7.82. Found: C, 71.36; H, 8.08.

$\lambda_{max}^{EtOH}$ 234 m$\mu$

E=24,300.

In the above reaction other alkyl oxalates may be used such as methyl oxalate, propyl oxalate, isopropyl oxalate and so on. After the bromine addition instead of using sodium methoxide solution in Example 5, other alkali metal alkoxides can be used such as the sodium or potassium ethoxides, sodium or potassium isopropoxides and the like resulting in the corresponding ethyl, isopropyl and other alkyl esters of 3,11-diketo-15α-methyl-15β hydroxy-4,17(20)-pregnadien-21-oate.

Example 1A

*Methyl 3-Keto-9α-Fluoro-15α-Methyl-11β,15β-Dihydroxy-4,17(20)-Pregnadien-21-Oate*

Substituting in Example 1 as starting material 9α-fluoro-15α-methyl-11β,15β-dihydroxyprogesterone results in the production of methyl 3-keto-9α-fluoro-15α-methyl-11β,15β-dihydroxy-4,17(20)-pregnadien-21-oate.

Example 1B

*Methyl 3-Keto-9α-Fluoro-11β,15α-Dihydroxy-4,17(20)-Pregnadien-21-Oate*

Substituting in Example 1 as starting material 9α-fluoro-11β,15α-dihydroxyprogesterone results in the production of methyl 3-keto-9α-fluoro-11β,15α-dihydroxy-4,17(20)-pregnadiene.

Substituting other starting materials in examples such as those shown in the preparations produces the compounds methyl 3-keto-9α-fluoro-11β,15β-dihydroxy-4,17(20)-pregnadiene, methyl 3,11-diketo-15β-hydroxy-4,17(20)pregnadiene, methyl 3,11-diketo-15α-hydroxy-4,17(20)pregnadiene, the acetate thereof, methyl 3-keto-9α-fluoro-11β,15β-dihydroxy-4,17(20)-pregnadiene, methyl 3-keto-9α-fluoro-11β,15α-dihydroxy - 4,17(20) - pregnadiene, methyl 3-keto-11β,15α-dihydroxy-4,17(20) pregnadiene, and the like.

Example 2

*11β,15β,21-Trihydroxy-15α-Methyl-4,17(20)-Pregnadien-3-One 21-Acetate*

A mixture of methyl 3,11-diketo-15α-methyl-15β-hydroxy-4,17(20)-pregnadien-21-oate (0.8 gram), 16 milliliters of benzene, 0.5 milliliter of pyrrolidine and 0.02 gram of para-toluenesulfonic acid was refluxed in a nitrogen atmosphere for a period of one hour. The solvent was removed in vacuo and ten milliliters of benzene was added and again removed under reduced pressure. The residue was dissolved in ten milliliters of benzene and added to a stirred solution of lithium aluminum hydride (0.5 gram) in 40 milliliters of absolute ether. The flask was washed with five milliliters of benzene and the washings were added to the lithium aluminum hydride solution. After stirring for two hours at room temperature, the reaction mixture was decomposed by the addition of 2 milliliters of ethyl acetate followed by one milliliter of water. The solvent was removed in vacuo and 1.5 milliliters of acetic acid in 34 milliliters of ethanol was added. After stirring for a period of fifteen minutes a solution of one gram of sodium hydroxide in ten milliliters of water was added. The mixture turned bright yellow. After stirring for another twenty minutes 1.25 milliliters of acetic acid was added and the reaction mixture concentrated to one half of its volume under reduced pressure. Thereafter a solution of 2 milliliters of concentrated sulfuric acid in 35 milliliters of water was added and stirred for fifteen minutes. The product was extracted twice with methylene chloride. The extracts were washed with saturated sodium bicarbonate solution and the solvent removed under reduced pressure. The residue was acetylated with 3 milliliters of acetic anhydride in 3 milliliters of pyridine. After standing all night, the mixture was stirred with a mixture of ice, water and hydrochloric acid. The layers were separated and the organic layer washed with saturated sodium bicarbonate solution. The organic extract was chromatographed over 80 grams of Florisil taking fractions of 75 milliliters as follows:

TABLE II

| Fractions | Solvent | Residue in Grams |
|---|---|---|
| 1 | Methylene chloride | 0.007 |
| 2 | do | .001 |
| 3 | acetone-Skellysolve B hexanes 1:9 | .006 |
| 4 | do | .008 |
| 5 | do | .006 |
| 6 | do | .006 |
| 7 | do | .008 |
| 8 | do | .006 |
| 9 | do | .006 |
| 10 | do | .006 |
| 11 | acetone-Skellysolve 15:85 | .005 |
| 12 | do | .006 |
| 13 | do | .006 |
| 14 | do | .006 |
| 15 | do | .008 |
| 16 | do | .008 |
| 17 | do | .006 |
| 18 | do | .010 |
| 19 | acetone-Skellysolve 2:8 | .002 |
| 20 | do | .008 |
| 21 | do | .021 |
| 22 | do | .068 |
| 23 | do | .149 |
| 24 | do | .104 |
| 25 | do | .072 |
| 26 | do | .017 |
| 27 | do | .018 |
| 28 | do | .012 |
| 29 | do | .012 |
| 30 | do | .012 |
| 31 | do | .012 |
| 32 | do | .012 |
| 33 | acetone | .012 |
| 34 | do | .012 |

Fractions 22–26, inclusive, were combined and evaporated, leaving 0.41 gram of an oil which crystallized slowly on standing. The product could not be recrystallized, but since the infra-red spectrum absorption was satisfactory it was used directly in the next step.

Example 2A

*9α-Fluoro-11β,15β,21-Trihydroxy-15α-Methyl-4,17(20)-Pregnadien-3-One 21-Acetate*

Substituting in the process of Example 2 the starting material with methyl 3-keto-9α-fluoro-15α-methyl-11β,15β-di-hydroxy-4,17(20)-pregnadien-21-oate results in the production of 9α-fluoro-11β,15β,21-trihydroxy-15α-methyl-4,17(20)-pregnadien-3-one 21-acetate.

Using for the acylation instead of acetic anhydride propionic, butyric, hexanoic or other anhydrides the corresponding propionate, butyrate, hexanoate and the like of 11β,15β,21-trihydroxy - 15α - methyl-4,17(20)-pregnadien-3-one is obtained.

Example 3

*15α-Methyl-15β-Hydroxyhydrocortisone Acetate*

0.265 gram of 11β, 15β,21-trihydroxy-15α-methyl-4,17(20)-pregnadien-3-one 21-acetate, dissolved in 9 milliliters of tertiary butyl alcohol, was treated with a solution of N-methyl morpholine oxide-peroxide (1 ml. required 42.0 ml. of 0.1 N $Na_2S_2O_3$ for titration) and a solution of 1.44 milligrams of osmium tetroxide in one milliliter of tertiary butyl alcohol. After stirring overnight at room temperature, the solvent was removed under reduced pressure and the residue was partitioned between water and methylene chloride. The aqueous layer was again extracted with methylene chloride, the extracts were combined and the solvent was removed in vacuo. The residue was chromatographed over 25 grams of Florisil anhydrous magnesium silicate taking fractions of fifty milliliters as follows:

TABLE III

| Fraction | Solvent |
| --- | --- |
| 1 | Methylene chloride. |
| 2–9 | Acetone: Skellysolve B 15:85. |
| 10 | Acetone: Skellysolve B 1:3. |
| 11 | Do. |
| 12 | Do. |
| 13 | Do. |
| 14 | Do. |
| 15 | Do. |
| 16 | Do. |
| 17 | Do. |
| 18 | Do. |
| 19 | Do. |
| 20 | Do. |
| 21–23 | Acetone. |

Fractions 12 through 17 were combined and evaporated to give 94 milligrams of material. This product was recrystallized from ethyl acetate to yield crystals of 15α-methyl-15β-hydroxyhydrocortisone 21-acetate melting at 216–218 degrees centigrade.

*Analysis.*—Calcd. for $C_{24}H_{34}O_7$: C, 66.34; H, 7.89. Found: C, 66.53; H, 8.05.

EXAMPLE 3A

*9α-Fluoro-15α-Methyl-15β-Hydroxyhydrocortisone 21-Acetate*

Substituting in Examples 2 and 3 as starting material 9α-fluoro-11β,15β,21-trihydroxy - 15α - methyl - 4,17(20)-pregnadien-3-one 21-acetate results in the production of 9α-fluoro-15α-methyl-15β - hydroxyhydrocortisone 21-acetate.

Submitting to the reactions of examples 2 and 3 the starting material produced in example 1B and those mentioned subsequently, the following compounds are produced: 9α - fluoro - 15α-hydroxyhydrocortisone diacetate, 9α-fluoro-15β-hydroxyhydrocortisone diacetate, 15α-hydroxyhydrocortisone diacetate, 15β - hydroxyhydrocortitone diacetate, as well as other 15,21-diesters.

EXAMPLE 4

*15α-Methyl-15β-Hydroxyhydrocortisone*

Through a solution of 0.5 gram of 15α-methyl-15β-hydroxyhydrocortisone acetate in 15 milliliters of ethanol was passed a current of nitrogen for a period of 15 minutes. To this solution was then added three milliliters of 95% ethanol containing 0.3 gram of potassium carbonate, similarly purged with nitrogen. The mixture was allowed to stand in a nitrogen atmosphere for a period of four hours and was then poured into water and neutralized by the addition of five percent hydrochloric acid. The precipitated material was collected on filter and recrystallized three times from acetone and Skellysolve B hexanes to give 15α-methyl-15β-hydroxyhydrocortisone in white crystalline form.

EXAMPLE 4A

*9α-Fluoro-15α-Methyl-15β-Hydroxyhydrocortisone*

In the same manner given in Example 4 9α-fluoro-15α-methyl-15β-hydroxyhydrocortisone 21-acetate can be hydrolized to give 9α-fluoro-15α-methyl-15β-hydroxyhydrocortisone.

Hydrolyzing as shown in Example 4 the diesters following Example 3A is productive of 9α-fluoro-15α-hydroxyhydrocortisone, 9α-fluoro - 15β - hydroxyhydrocortisone and 15α- and 15β-hydroxyhydrocortisone.

EXAMPLE 5

*15α-Methyl-15β-Hydroxyhydrocortisone Propionate*

To a solution of 15α-methyl-15β-hydroxyhydrocortisone (0.1 gram) in two milliliters of pyridine was added 0.5 milliliter of propionic anhydride in one milliliter of pyridine. The mixture was allowed to stand for a period of four hours whereupon it was poured into twenty milliliters of water and ice. A solid precipitated which was collected on a filter and twice recrystallized from acetone-Skellysolve B hexanes to give 15α-methyl-15β-hydroxyhydrocortisone 21-propionate.

EXAMPLE 5A

*15α-Methyl-15β-Hydroxyhydrocortisone 21-(β-Cyclopentylpropionate*

In the same manner given in Example 5, 15α-methyl-15β-hydroxyhydrocortisone when reacted with β-cyclopentylpropionyl chloride gives 15α-methyl-15β-hydroxyhydrocortisone 21-(β-cyclopentylpropionate).

Substituting in Example 5 for the propionic anhydride, butyric anhydride, valeric anhydride, hexanoic anhydride, octanoic anhydride, benzoyl chloride, phenylacetyl chloride, lauroyl chloride or other acid anhydrides or acyl halides, produces the corresponding 15α-methyl-15β-hydroxyhydrocortisone 21-acylates such as the 21-butyrate, valerate, hexanoate, octanoate, benzoate, phenylacetate, and laurate of 15α-methyl-15β-hydroxyhydrocortisone.

In the same manner given in Example 5, the 15,21-diesters of 15α- and 15β-hydroxyhydrocortisone and 9α-fluoro-15α(or 15β)-hydroxyhydrocortisone can be prepared such as the 15,21-propionate, butyrate, isovalerate, hexanoate, benzoate, β-cyclopentylpropionate, phenylacetate, phenylpropionate, laurate and the like.

EXAMPLE 6

*15α-Methyl-15β-Hydroxycortisone Acetate*

To a mixture of 0.2 gram of 15α-methyl-15β-hydroxyhydrocortisone 21-acetate in three milliliters of acetic acid was added 100 milligrams of chromic anhydride, dissolved in one milliliter of acetic acid containing four drops of water. This mixture was allowed to stand at room temperature for a period of four hours. Thereafter, the mixture was poured into twenty milliliters of water, neutralized with five percent sodium bicarbonate solution and the precipitated material collected on filter. This material was recrystallized twice from acetone-Skellysolve B hexanes to give 15α-methyl-15β-hydroxycortisone acetate.

EXAMPLE 6A

*9α-Fluoro-15α-Methyl-15β-Hydroxycortisone 21-Acetate*

In the same manner given in Example 6, 9α-fluoro-15α-methyl-15β-hydroxyhydrocortisone 21-acetate can be oxidized to 9α-fluoro-15α-methyl-15β-hydroxycortisone 21-acetate.

EXAMPLE 7

*15α-Methyl-15β-Hydroxycortisone*

In the same manner as shown in Example 4 15α-methyl-15β-hydroxycortisone is obtained by hydrolyzing in a nitrogen atmosphere with potassium or sodium carbonates, or potassium or sodium bicarbonates 15α-methyl-15β-hydroxycortisone acetate.

EXAMPLE 7A

*9α-Fluoro-15α-Methyl-15β-Hydroxycortisone*

In the same manner as given in Example 4 9α-fluoro-15α-methyl-15β-hydroxycortisone 21-acetate can be hydrolyzed to give 9α-fluoro-15α-methyl-15β-hydroxycortisone.

EXAMPLE 8

*15α-Methyl-15β-Hydroxycortisone Propionate*

In the same manner as shown in Example 5 15α-methyl-15β-hydroxycortisone is reacted in pyridine solution with propionic anhydride to give 15α-methyl-15β-hydroxycortisone 21-propionate.

EXAMPLE 9

15α-Methyl-15β-Hydroxycortisone 21-(β-Cyclopentylpropionate)

In the same manner as shown in Example 5 15α-methyl-15β-hydroxycortisone is reacted with β-cyclopentylpropionyl chloride in pyridine solution to give 15α-methyl-15β-hydroxycortisone 21-(β-cyclopentylpropionate).

In the same manner as shown in Example 6 15α-hydroxycortisone diacetate, 15β-hydroxycortisone diacetate, 9α-fluoro-15α-hydroxycortisone diacetate, 9α-fluoro-15β-hydroxycortisone diacetate can be obtained which can be hydrolyzed as shown in Example 4 to give the respective free alcohols 15α- and 15β-hydroxycortisone, 9α-fluoro-15α- and 15β-hydroxycortisone.

The above diols, 15α- and 15β-hydroxycortisone and 9α-fluoro-15α- and 15β-hydroxycortisone can be esterified in conventional manner to give such esters as the 15, 21-dipropionate, diphenylacetate, dihexanoate, dibenzoate, divalerate, dilaurate, and the like of 15α- and 15β-hydroxycortisone, and 9α-fluoro-15α- and 15β-hydroxycortisone.

EXAMPLE 10

15α-Methyl-15β-Hydroxyprednisolone

Six 100-milliliter portions of a medium in 250-milliliter Erlenmeyer flasks containing one percent glucose, two percent corn steep liquor (60 percent solids) and tap water was adjusted to a pH of 4.9. This medium was sterilized for 45 minutes at 15 pounds per square inch pressure and inoculated with a one to two day growth of *Septomyxa affinis* A.T.C.C. 6737. The Erlenmeyer flasks were shaken at room temperature at about 24 degrees centigrade for a period of three days. At the end of this period, this 600-milliliter volume was used as an inoculum for ten liters of the same glucose-corn steep liquor medium which in addition contained ten milliliters of an anti-foam (a mixture of lard oil and octadecanol). The fermentor was placed into the water bath, adjusted to 28 degrees centigrade, and the contents stirred (at 300 r.p.m.) and aerated (0.5 liter of air per ten liters of beer per minute). After 17 hours of incubation, when a good growth developed and the acidity rose to pH 6.7, two grams of 15α-methyl-15β-hydroxyhydrocortisone plus one gram of 3-ketobisnor-4-cholen-22-al, dissolved in 115 milliliters of dimethylformamide, was added and the incubation carried out at the same temperature and aeration for 24 hours. The mycelium was filtered off and the steroidal material was extracted with methylene chloride. The methylene chloride solution was evaporated to dryness and the resulting residue chromatographed over a Florisil column. The fraction containing 15α-methyl-15β-hydroxyprednisolone as determined by paper chromatography was separated, evaporated and the product recrystallized from acetone to give 15α-methyl-15β-hydroxyprednisolone.

EXAMPLE 10A

15α-Methyl-15β-Hydroxyprednisone

Substituting for 15α-methyl-15β-hydroxyhydrocortisone 15α-methyl-15β-hydroxycortisone in the above Example 10 yields 15α-methyl-15β-hydroxyprednisone.

EXAMPLE 10B

9α-Fluoro-15α-Methyl-15β-Hydroxyprednisolone

Substituting in Example 9 as starting materials 9α-fluoro-15α-methyl-15β-hydroxyhydrocortisone results in the production of 9α-fluoro-15α-methyl-15β-hydroxyprednisolone.

EXAMPLE 10C

9α-Fluoro-15α-Methyl-15β-Hydroxyprednisone

Substituting in Example 10 as starting materials 9α-fluoro-15α-methyl-15β-hydroxycortisone results in the production of 9α-fluoro-15α-methyl-15β-hydroxyprednisone.

In the same manner given in Example 10 15α-hydroxyprednisolone and 15α-hydroxyprednisone, 9α-fluoro-15α-hydroxyprednisone and 9α-fluoro-15α-hydroxyprednisone as well as the 15β-epimers of these compounds are produced from the corresponding 15α-hydroxyhydrocortisones, -cortisone, the 9-fluoro analogues and the epimers thereof.

EXAMPLE 11

15α-Methyl-15β-Hydroxyprednisolone 21-Acetate

A solution of 100 milligrams of 15α-methyl-15β-hydroxyprednisolone in one ml. of pyridine and one ml. of acetic anhydride was allowed to stand at room temperature (about 25 degrees centigrade) for a period of four hours. The mixture was thereupon poured into 20 ml. of water. A precipitate formed which was recovered by filtration, washed on the filter with water and crystallized from acetone and Skellysolve B hexanes to give near white crystals of 15α-methyl-15β-hydroxyprednisolone 21-acetate.

EXAMPLE 12

15α-Methyl-15β-Hydroxyprednisolone 21-Propionate

In the same manner given in Example 11, treating 15α-methyl-15β-hydroxyprednisolone in pyridine solution with propionic anhydride gives 15α-methyl-15β-hydroxyprednisolone 21-propionate.

EXAMPLE 13

15α-Methyl-15β-Hydroxyprednisolone 21-Benzoate

In the same manner given in Example 11, treating 15α-methyl-15β-hydroxyprednisolone in pyridine solution with benzoic anhydride gives 15α-methyl-15β-hydroxyprednisolone 21-benzoate.

EXAMPLE 14

15α-Methyl-15β-Hydroxyprednisolone 21-Phenylacetate

In the same manner given in Example 11, treating 15α-methyl-15β-hydroxyprednisolone in pyridine solution with phenylacetyl chloride gives 15α-methyl-15β-hydroxyprednisolone 21-phenylacetate.

EXAMPLE 15

15α-Methyl-15β-Hydroxyprednisone 21-Acetate

In the same manner given in Example 11, treating 15α-methyl-15β-hydroxyprednisone in pyridine solution with acetic anhydride gives 15α-methyl-15β-hydroxyprednisone 21-acetate.

EXAMPLE 16

15α-Methyl-15β-Hydroxyprednisone 21-Propionate

In the same manner given in Example 11, treating 15α-methyl-15β-hydroxyprednisone in pyridine solution with propionic anhydride gives 15α-methyl-15β-hydroxyprednisone 21-propionate.

EXAMPLE 17

15α-Methyl-15β-Hydroxyprednisone 21-Benzoate

In the same manner given in Example 11, treating 15α-methyl-15β-hydroxyprednisone in pyridine solution with benzoic anhydride gives 15α-methyl-15β-hydroxyprednisone 21-benzoate.

EXAMPLE 18

15α-Methyl-15β-Hydroxyprednisone 21-Phenylacetate

In the same manner given in Example 11, treating 15α-methyl-15β-hydroxyprednisone in pyridine solution with phenylacetic chloride gives 15α-methyl-15β-hydroxyprednisone 21-phenylacetate.

EXAMPLE 19

9α-Fluoro-15α-Methyl-15β-Hydroxyprednisone 21-Acetate

In the same manner given in Example 11, treating 9α-fluoro-15α-methyl-15β-hydroxyprednisolone in pyridine solution with acetic anhydride gives 9α-fluoro-15α-methyl-15β-hydroxyprednisolone 21-acetate.

EXAMPLE 20

*9α-Fluoro-15α-Methyl-15β-Hydroxyprednisolone 21-Proprionate*

In the same manner given in Example 11, treating 9α-fluoro-15α-methyl-15β-hydroxyprednisolone in pyridine solution with propionic anhydride gives 9α-fluoro-15α-methyl-15β-hydroxyprednisolone 21-propionate.

EXAMPLE 21

*9α-Fluoro-15α-Methyl-15β-Hydroxyprednisolone 21-Benzoate*

In the same manner given in Example 11, treating 9α-fluoro-15α-methyl-15β-hydroxyprednisolone in pyridine solution with benzoic anhydride gives 9α-fluoro-15α-methyl-15β-hydroxyprednisolone 21-benzoate.

EXAMPLE 22

*9α-Fluoro-15α-Methyl-15β-Hydroxyprednisolone 21-Phenylacetate*

In the same manner given in Example 11, treating 9α-fluoro-15α-methyl-15β-hydroxyprednisolone in pyridine solution with phenylacetic chloride gives 9α-fluoro-15α-methyl-15β-hydroxyprednisolone 21-phenylacetate.

EXAMPLE 23

*9α-Fluoro-15α-Methyl-15β-Hydroxyprednisone 21-Acetate*

In the same manner given in Example 11, treating 9α-fluoro-15α-methyl-15β-hydroxyprednisone in pyridine solution with acetic anhydride gives 9α-fluoro-15α-methyl-15β-hydroxyprednisone 21-acetate.

EXAMPLE 24

*9α-Fluoro-15α-Methyl-15β-Hydroxyprednisone 21-Propionate*

In the same manner given in Example 11, treating 9α-fluoro-15α-methyl-15β-hydroxyprednisone in pyridine solution with propionic anhydride gives 9α-fluoro-15α-methyl-15β-hydroxyprednisone 21-propionate.

EXAMPLE 25

*9α-Fluoro-15α-Methyl-15β-Hydroxyprednisone 21-Benzoate*

In the same manner given in Example 11, treating 9α-fluoro-15α-methyl-15β-hydroxyprednisone in pyridine solution with benzoic anhydride gives 9α-fluoro-15α-methyl-15β-hydroxyprednisone 21-benzoate.

EXAMPLE 26

*9α-Fluoro-15α-Methyl-15β-Hydroxyprednisone 21-Phenylacetate*

In the same manner given in Example 11, treating 9α-fluoro-15α-methyl-15β-hydroxyprednisone in pyridine solution with phenylacetic chloride gives 9α-fluoro-15α-methyl-15β-hydroxyprednisone 21-phenylacetate.

In the same manner given in Example 11, other esters of such steroids as described before can be prepared such as the 21-formate, acetate, propionate, benzoate, valerate, hexanoate, octanoate, decanoate, undecylenate, laurate, 9(10)-decylenate, 9(10)-dodecylenate, phenylpropionate, crotonate, acrylate, hemi-maleate, hemi-succinate, diphenylacetate, tertiary butylacetate, dineopentylacetate and the like of 15α-methyl-15β-hydroxyhydrocortisone, 15α-methyl - 15β - hydroxycortisone, 9α - fluoro - 15α - methyl-15β - hydroxy - hydrocortisone, 9α - fluoro - 15α - methyl-15β-hydroxycortisone, 15α-methyl-15β-hydroxyprednisolone, 15α-methyl-15β-hydroxyprednisone, 9α-fluoro-15α-methyl-15β-hydroxyprednisolone, 9α-fluoro-15α-methyl-15β-hydroxyprednisone, 9α-fluoro-15α-hydroxyprednisolone, 9α-fluoro-15α-hydroxyprednisone, 9α-fluoro-15β-hydroxyprednisolone, 9α-fluoro-15β-hydroxyprednisone and the 15α-hydroxyprednisolone, 15α-hydroxyprednisone and the 15β-epimers thereof.

Similarly, the 11-keto-15α-hydroxyprogesterones having methyl group in positions 2α, 6α, 16α, 16β, and the like when used in the processes of Preparations 1 through 12 and Examples 1 through 26 will give the corresponding hydrocortisones, such as 2α,15α-dimethyl-15β-hydroxyhydrocortisone and -cortisone, 6α,15α-dimethyl-15β-hydroxyhydrocortisone and -cortisone, 15α,16α-dimethyl-15β-hydroxyhydrocortisone and -cortisone, 15α,16β-dimethyl-15β-hydroxyhydrocortisone and -cortisone, 2α,6α,-15α-trimethyl-15β-hydroxyhydrocortisone and -cortisone, 2α,15α,16α - trimethyl - 15β - hydroxyhydrocortisone and -cortisone, 6α,15α,16α-trimethyl-15β-hydroxyhydrocortisone and -cortisone, 2α,15α,16β-trimethyl-15β-hydroxyhydrocortisone and -cortisone, 6α,15α,16β-trimethyl-15β-hydroxyhydrocortisone and -cortisone, 2α,6α,16α,16α-tetramethyl-15β-hydroxyhydrocortisone and -cortisone, 2α,6α,-15α,16β-tetramethyl-15β-hydroxyhydrocortisone and -cortisone and the like and the 21-esters thereof such as the acetate, propionate, butyrate, valerate, hexanoate, octanoate, benzoate, phenylacetate, β-cyclopentylpropionate, laurate, cinnamate and the like, and the 1-dehydro derivatives thereof.

We claim:

1. 9α-fluoro-15α-methyl-15β-hydroxyhydrocortisone.
2. 9α - fluoro - 15α - methyl - 15β - hydroxyhydrocortisone acetate.
3. 9α-fluoro-15α-methyl-15β-hydroxycortisone.
4. 9α-fluoro-15α-methyl-15β-hydroxycortisone acetate.
5. 9α-fluoro-15α-methyl-15β-hydroxyprednisolone.
6. 9α-fluoro-15α-methyl-15β-hydroxyprednisolone acetate.
7. 9α-fluoro-15α-methyl-15β-hydroxyprednisone.
8. 9α - fluoro - 15α - methyl - 15β - hydroxyprednisone acetate.

References Cited in the file of this patent

UNITED STATES PATENTS

| | | |
|---|---|---|
| 2,852,511 | Fried | Sept. 16, 1958 |
| 2,889,255 | Murray et al. | June 2, 1959 |
| 2,958,631 | Charney | Nov. 1, 1960 |

UNITED STATES PATENT OFFICE
CERTIFICATE OF CORRECTION

Patent No. 3,053,864                      September 11, 1962

Philip F. Beal et al.

It is hereby certified that error appears in the above numbered patent requiring correction and that the said Letters Patent should read as corrected below.

Column 5, line 67, for "67.97" read -- 69.97 --; column 9, lines 12 and 13, for "-15$\beta$ hydroxy-" read -- -15$\beta$-hydroxy- --; column 12, lines 9 and 10, for "21-($\beta$-Cyclopentylpropionate", in italics, read -- 21-($\beta$-Cyclopentylpropionate) --, in italics; column 14, line 71, for "*—Hydroxyprednisone", in italics, read -- —Hydroxyprednisolone --, in italics.

Signed and sealed this 15th day of January 1963.

(SEAL)
Attest:

ERNEST W. SWIDER                      DAVID L. LADD
Attesting Officer                     Commissioner of Patents